United States Patent [19]

Caldwell

[11] Patent Number: 5,456,160
[45] Date of Patent: Oct. 10, 1995

[54] METHOD FOR REDUCING SEAL STICTION IN A HYDRAULIC CYLINDER

[75] Inventor: Richard Caldwell, Winsted, Conn.

[73] Assignee: Otis Elevator Company, Farmington, Conn.

[21] Appl. No.: 250,738

[22] Filed: May 27, 1994

[51] Int. Cl.⁶ .................................................. F16J 15/18
[52] U.S. Cl. .................. 92/168; 92/24; 92/77; 92/261; 277/1; 277/31
[58] Field of Search ..................... 92/24, 28, 27, 92/168, 77; 277/1, 31

[56] References Cited

U.S. PATENT DOCUMENTS

| | | |
|---|---|---|
| 1,005,954 | 10/1911 | Fritz . |
| 2,165,410 | 7/1939 | Penick et al. . |
| 2,395,911 | 3/1946 | Schoenfeld . |
| 2,731,281 | 1/1956 | Knox . |
| 2,927,774 | 3/1960 | Ormsby ......................................... 277/31 |
| 3,083,973 | 4/1963 | Lucky ........................................ 277/31 |
| 3,180,232 | 4/1965 | Ayers, Jr. . |
| 3,268,233 | 8/1966 | Brown . |
| 3,333,513 | 8/1967 | Wettstein . |
| 3,761,099 | 9/1973 | Hansson . |
| 3,801,111 | 4/1974 | Messenger . |
| 3,848,877 | 11/1974 | Bengtsson et al. . |
| 4,122,759 | 10/1978 | Runkel et al. . |
| 4,257,230 | 3/1981 | Lundholm . |
| 4,597,483 | 7/1986 | Porel et al. . |
| 4,822,056 | 4/1989 | Bowers . |
| 4,993,721 | 2/1991 | Uezono . |
| 5,140,904 | 8/1992 | Schonlau ................................. 92/130 R |
| 5,213,340 | 5/1993 | Azibert et al. . |
| 5,263,404 | 11/1993 | Gaucher et al. . |

Primary Examiner—Thomas E. Denion

[57] ABSTRACT

A method of reducing seal stiction in a hydraulic cylinder is provided comprising the steps of providing a hydraulic cylinder, having a housing, a piston, and a seal, providing apparatus for rotating the seal about the piston, and rotating the seal about the axis of the piston at the same time as the piston begins to axially displace.

8 Claims, 3 Drawing Sheets

5,456,160

METHOD FOR REDUCING SEAL STICTION IN A HYDRAULIC CYLINDER

BACKGROUND OF THE INVENTION

1. Technical Art

The present invention pertains to hydraulic cylinders in general, and to solving seal stiction in hydraulic cylinders in particular.

2. Background Information

Hydraulic cylinders generally comprise a piston displaceably mounted within a housing. The housing includes at least one port through which fluid can be passed into or out of the housing. Fluid pressing against the surface area of the piston perpendicular to the stroke of the piston will force the piston out of the housing when the pressure of the fluid is great enough to overcome the load supported by the piston. Likewise, when the pressure of the fluid provides insufficient force to overcome the load supported by the piston, the piston will retract within the housing. Physical stops within the housing prevent the piston from retracting completely into, or extending completely out of, the housing. One or more seals around the piston prevent pressurized fluid from leaking out between the housing and the piston, thereby maintaining the pressure difference between the fluid inside the housing and the environment outside.

A person of skill in the art will recognize that the seals preventing fluid from escaping around the piston influence the amount of force necessary to move the piston. When the piston is moving, the seals provide an essentially constant amount of resistive force to the movement of the piston. When the piston is stationary, however, the amount of resistive force provided by the seals changes as a function of time. Immediately after the cylinder piston stops, the seal in contact with the piston begins to conform with the sealing surface of the piston, thereby increasing the surface area in contact between the seal and the piston. As the contact area increases, the amount of resistive force increases, and therefore the amount of force necessary to move the piston as well. After a short period of time, the percentage of surface area in contact between the piston and the seal does not appreciably increase. Thereafter, the force necessary to move the piston does not appreciably change either.

The difference in force necessary to move the piston between the static state and the dynamic state causes a motion control problem known in the art as "stiction". The control problem occurs when the force necessary to move a static piston remains applied after the piston has begun moving, thereby causing the piston to accelerate. The acceleration causes the piston to jerk, somewhat erratically. By way of an example, a hydraulic elevator having an elevator car constrained to motion within a hoistway is powered by a hydraulic cylinder. If stiction is present, a passenger in the elevator will experience a jarring sensation as the car goes from a static state at a landing to a dynamic state leaving the landing. Any abrupt fluctuation in elevator motion is perceived as an indicium of poor quality. Hence, it is desirable to minimize or eliminate stiction in a fluid cylinder.

DISCLOSURE OF THE INVENTION

It is, therefore, an object of the present invention to improve the motion control of a hydraulic cylinder.

It is a further object of the present invention to minimize or eliminate seal stiction in a hydraulic cylinder.

It is a further object of the present invention to minimize seal stiction in a hydraulic cylinder using commercially available seals.

According to the present invention, a method of reducing seal stiction in a hydraulic cylinder is provided comprising the steps of providing a hydraulic cylinder having a housing, a piston, and a seal, providing means for rotating the seal about the piston, and rotating the seal about the axis of the piston at the same time the piston begins to axially displace.

According to one embodiment of the present invention, the seal is rotated about the piston prior to the axial displacement of the piston. The rotation is maintained for a period of time up to and after the piston has begun axially moving.

According to one aspect of the present invention, a seal arrangement is provided having a pair of seals mounted in a carriage ring. One of the seals prevents fluid from escaping the housing between the piston and the carriage ring. The other seal prevents fluid from escaping the housing between the housing and the carriage ring.

An advantage of the present invention is that seal stiction is minimized or avoided by rotating the seal about the axis of the piston of a hydraulic cylinder prior to axially displacing the piston. Rotating the seal about the piston at the same time the piston is axially displaced eliminates the stiction, and therefore the axial movement control problem associated with stiction as well.

Another advantage of the present invention is that the present invention uses seals that are commercially available in its seal arrangement.

The foregoing features and advantages of the present invention will become more apparent in light of the following detailed description of the best mode for carrying out the invention and accompanying drawings.

BEST MODE FOR CARRYING OUT THE INVENTION

Figure 1:
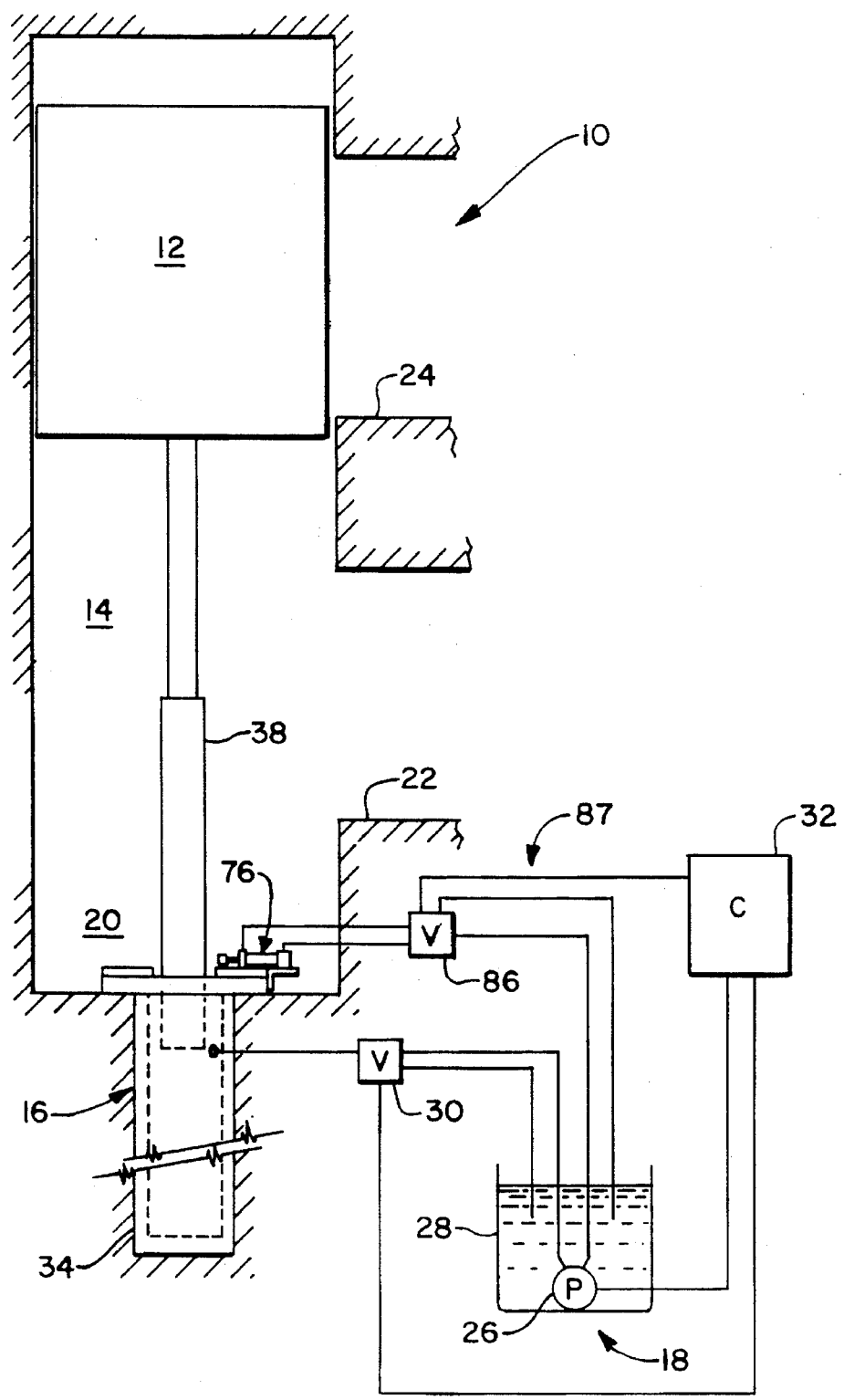
FIG. 1 is a diagrammatic view of an elevator having a car propelled through a hoistway by a hydraulic cylinder.

Referring to FIG. 1, an elevator 10 is shown diagrammatically having an elevator car 12, a hoistway 14, a first hydraulic cylinder 16, and a hydraulic power unit 18. The hoistway 14 extends from a pit 20, usually located below the ground floor of the building, vertically upward through the building. FIG. 1 simplistically shows a building having a first 22 and a second 24 landing, although it is known that a hydraulic elevator may be used in buildings having more than two landings. The hydraulic power unit 18 includes a pump 26, fluid reservoir 28, an electromechanical first fluid valve 30, and a controller 32 as is known in the art. A person of skill in the art will recognize that a variety of programmable controllers are available and may be used to control the output of the pump and coordinate the position of the electromechanical fluid valve(s).

Figure 2:
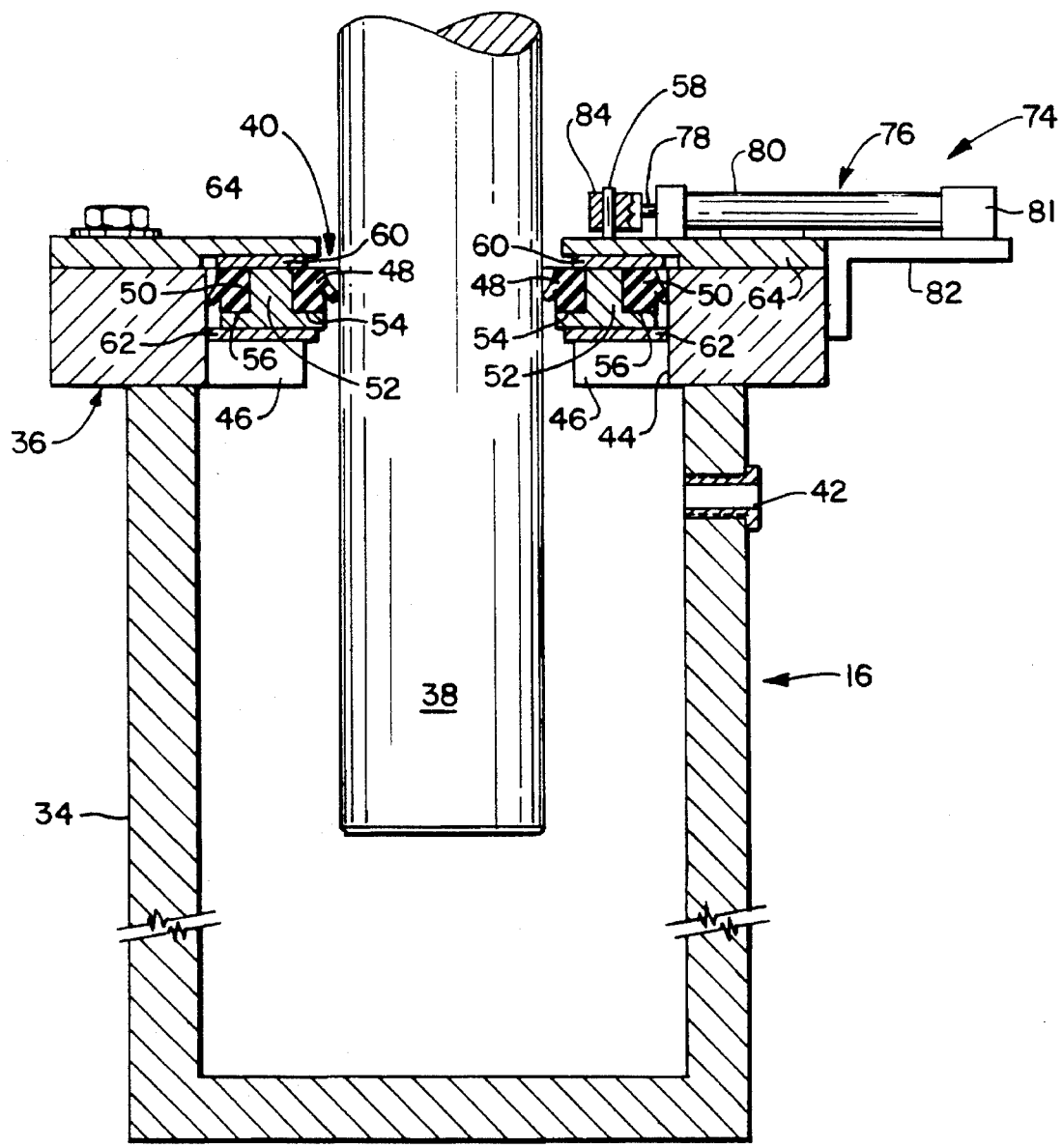
FIG. 2 is a sectional diagrammatic view of the hydraulic cylinder shown in FIG. 1.

Referring to FIG. 2, the first hydraulic cylinder 16 comprises a housing 34 having a cylinder head 36 attached to one end of the housing 34, a piston 38 displaceably mounted in the housing 34, and a seal arrangement 40 to prevent the escape of fluid between the piston 38 and the cylinder head 36. The housing 34 includes a port 42 through which hydraulic fluid may enter and exit the housing 34. The cylinder head 36 is attached to the housing 34 by conventional means such as screw thread, welding, or clamps as is known in the art. The cylinder head 36 includes a bore 44 for receiving the seal arrangement 40 and a plurality of shoulder sections 46 extending radially inward to support the seal arrangement 40.

Figure 3:
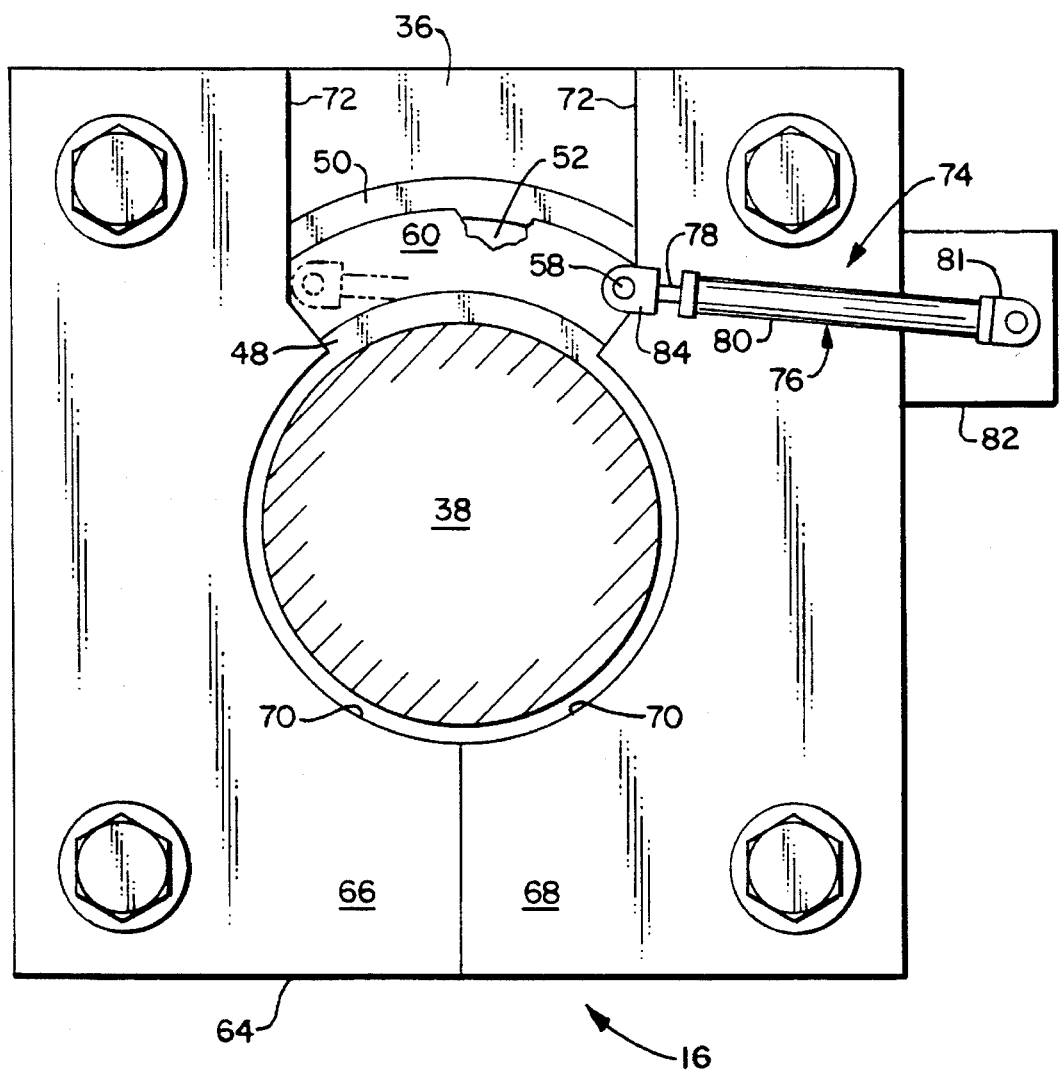
FIG. 3 is a top view of the hydraulic cylinder shown in FIG. 1.

Referring to FIGS. 2 and 3, the seal arrangement 40 comprises an piston seal 48, a cylinder head seal 50, and a carriage ring 52. The carriage ring 52 comprises a first seat 54 for receiving the piston seal 48 and a second seat 56 for receiving the cylinder head seal 50. A stud 58 is fixed to and extends out of the carriage ring 52. The seal arrangement 40 further includes an upper bearing ring 60 and a lower bearing ring 62 (shown in FIG. 2), each comprised of an oil impregnated bronze. The bearing rings 60,62 may alternatively comprise roller, ball, or other type bearings to facilitate movement of the carriage ring 52 relative to the cylinder head 36. The lower bearing ring 62 is positioned between the shoulder sections 46 and the bottom of the carriage ring 52 and the upper bearing ring 60 is positioned between the top of the carriage ring 52 and a retaining plate 64 attached to the top of the cylinder head 36. The retaining plate 64 as shown in FIG. 3 comprises a first half 66 and a second half 68, both of which include a semi-circular shaped edge 70. When the halves 66,68 are attached to the cylinder head 36, the semi-circular shaped edges 70 form a center bore for receiving the piston 38 of the first hydraulic cylinder 16. Each retaining plate half 66,68 further comprises a cut away section 72 to expose the stud 58 extending upward from the carriage ring 52, through the upper bearing ring 60. The carriage ring 52 and bearing rings 60,62 form a loose running fit between the shoulder sections 46 and the retaining plate 64 after assembly.

An apparatus 74 for rotating the seal arrangement 40 comprises a second hydraulic cylinder 76 having a piston 78 displaceably mounted in a housing 80. The second hydraulic cylinder 76 is a double acting cylinder and therefore may be extended or retracted under power as is known in the art. The housing 80 includes a base 81 for pivotly mounting the cylinder 76. The base 81 is pivotly attached to a bracket 82 attached to the cylinder head 36 of the first hydraulic cylinder 16. A pivot block 84 is attached to the external end of the piston 78. The pivot block 84 pivotly receives the stud 58 fixed to the carriage ring 52. An electromechanical second fluid valve 86 and appropriate piping 87 (shown schematically in FIG. 1) are used to regulate the flow and pressure of fluid to and from the second hydraulic cylinder 76. Pressurized fluid flows to the second fluid valve 86 from the pump 26 and is returned to the fluid reservoir 28 as is necessary. The second fluid valve 86 operates in response to signals sent from the controller 32.

Referring to FIGS. 1 and 2, in the operation of the elevator 10, the controller 32 is programmed to control the position and motion of the first hydraulic cylinder piston 38, and therefore the elevator car 12 within the hoistway 14, by coordinating the operation of the pump 26 and the first fluid valve 30. When the car 12 is stationary at a particular landing 22,24 the controller 32 signals the first fluid valve 30 to prevent fluid within the housing 34 from returning to the reservoir 28. The position of the piston 38 and the attached elevator car 12 is therefore maintained, assuming fluid cannot escape elsewhere. The weight of the elevator car 12, the piston 38, and any peripheral elements (not shown) which may be attached to the car 12, pressurize the fluid within the housing 34. The piston seal 48 and the cylinder head seal 50 as shown in FIG. 2 prevent fluid from escaping between the cylinder head 36 and the piston 38.

When a call is made directing the car 12 to a higher floor, the controller 32 energizes the pump 26. The first 30 and second 86 fluid valves direct the output of the pump 26 back to the reservoir 28 until the output reaches a predetermined minimum pressure. Once the minimum pressure has been reached, the controller 32 signals the second fluid valve 86 to direct fluid to the second hydraulic cylinder 76 a period of time before the first fluid valve 30 is signaled to permit fluid to the first hydraulic cylinder 16. The period of time is great enough such that the second hydraulic cylinder 76 begins to rotate the seal arrangement 40 (FIG. 2) about the piston 38 of the first hydraulic cylinder 16, before the first hydraulic cylinder 16 begins to axially move. Alternatively, the controller 32 may signal the fluid valves 30,86 to allow pressurized fluid to the hydraulic cylinders 16,76 in such a manner that the first hydraulic cylinder 16 begins moving at the same time as the second hydraulic cylinder 76 begins to rotate the seal arrangement 40. In both cases, the stroke and control of the second hydraulic cylinder 76 is such that the seal arrangement 40 is kept in motion until the first hydraulic cylinder piston 38 is moving enough to appreciably eliminate any stiction that might be present between the piston seal 48 and the piston 38. The controller 32 is programmed to signal the second fluid valve 86 to actuate the double acting second hydraulic cylinder 76 in a first direction a first time, and then in the opposite direction the next time, thereby obviating the need to "reset" the second hydraulic cylinder 76. A person of ordinary skill in the art will recognize that the controller 32 and the fluid valves 30,86 may also be programmed and chosen respectively so that the fluid valves 30,86 actuate at different pressure levels. For instance, the necessary minimum pressure to actuate the second hydraulic cylinder 76 may be less than the minimum pressure necessary to actuate the first hydraulic cylinder 16.

When a call is made directing the car 12 to a lower floor, the controller 32 energizes the pump 26 and signals the first 30 and second 86 fluid valves to direct the output of the pump 26 back to the reservoir 28 until the output reaches a predetermined minimum pressure. At the predetermined pressure the controller 32 signals the second fluid valve 86 to allow pressurized fluid to the second hydraulic cylinder 76, thereby causing the seal arrangement 40 to rotate. The controller 32 may subsequently: (1) wait a period of time after the seal arrangement 40 has begun to rotate to signal the first fluid valve 30 to allow fluid from the first hydraulic cylinder 16 to return to the reservoir 28, thereby lowering the first hydraulic cylinder piston 38 and elevator car 12; or (2) the controller 32 may signal the fluid valves 30,86 to allow pressurized fluid to the second hydraulic cylinder 76 and allow pressurized fluid from the first hydraulic cylinder 16 in such a manner that the first hydraulic cylinder 16 begins moving at the same time as the second hydraulic cylinder 76 begins to rotate the seal arrangement 40. In both cases, the stroke and control of the second hydraulic cylinder 76 is such that the seal arrangement 40 is kept in motion until the first hydraulic cylinder piston 38 is moving enough to appreciably eliminate any stiction that might be present between the piston seal 48 and the piston 38.

Although the invention has been shown and described with respect to a best mode embodiment thereof, it should be understood by those skilled in the art that various other changes, omissions and additions in the form and detail thereof may be made therein without departing from the spirit and scope of the claimed invention. For example, an electric drive with a gear may be used to drive a carriage ring having a matched gear. Alternatively, a geared carriage ring may be used in combination with a hydraulic cylinder having a pawl attached to the end of the piston. The pawl is driven outwardly by the extending piston and the seal arrangement is rotated as the pawl engages the geared carriage ring.

A person of skill in the art will recognize further that alternative seal arrangements may be used which are capable of being rotated to reduce or eliminate seal stiction in an axially acting hydraulic cylinder.

A person of skill in the art will recognize still further that the above described method of reducing seal stiction in a hydraulic cylinder is not dependent on the hydraulic cylinder being similar to that described in the best mode example given heretofore. On the contrary, the method may be used on a variety of hydraulic cylinders including double acting cylinders and lateral piston motion in other mechanical electrical devices.

I claim:

1. A method for reducing seal stiction in a hydraulic cylinder, comprising the steps of:
   providing a hydraulic cylinder, having:
     a housing, having a port through which fluid may pass into and out of said housing;
     a piston, displaceably mounted within said housing; and
     a seal, mounted on said housing around the periphery of said piston,
   wherein said seal prevents fluid from escaping said housing between said housing and said piston;
   providing means for rotating said seal;
   rotating said seal radially about said piston before axially displacing said piston relative to said housing;
   maintaining said rotation of said seal about said piston for a period of time after said piston has begun axially moving.

2. A method for reducing seal stiction in a hydraulic cylinder, comprising the steps of:
   providing a hydraulic cylinder, having:
     a housing, having a port through which fluid may pass into and out of said housing;
     a piston, displaceably mounted within said housing; and
     a seal, mounted on said housing around the periphery of said piston,
   wherein said seal prevents fluid from escaping said housing between said housing and said piston;
   providing means for rotating said seal;
   rotating said seal radially about said piston at the same time said piston is axially displaced relative to said housing.

3. A method for reducing seal stiction in a hydraulic cylinder, comprising the steps of:
   providing a first hydraulic cylinder, having:
     a housing, having a cylinder head attached to one end of said housing, and a port through which fluid may pass into and out of said housing, wherein said cylinder head includes a center bore;
     a piston, having an axis, said piston axially displaceably mounted within said housing; and
     a seal arrangement, mounted in said center bore of said cylinder head around the periphery of said piston, wherein said seal arrangement prevents fluid from escaping said housing between said cylinder head and said piston;
   providing means for rotating said seal arrangement about said axis of said piston;
   rotating said seal about said axis of said piston before axially displacing said piston relative to said housing;
   maintaining said rotation of said seal about said piston for a period of time up to said piston has begun axially moving.

4. A method for reducing seal stiction in a hydraulic cylinder according to claim 3, wherein said means for rotating said seal arrangement comprises:
   a second hydraulic cylinder, having a piston displaceably mounted in a housing, said second hydraulic cylinder being a double acting type cylinder;
   means for engaging said seal arrangement and said second hydraulic cylinder;
   wherein said engaging means engages said seal arrangement and said second hydraulic cylinder such that axial movement of said second hydraulic cylinder piston causes said seal arrangement to rotate about said first hydraulic cylinder piston.

5. A hydraulic cylinder, comprising:
   a housing, having a cylinder head attached to one end of said housing, and a port through which fluid may pass into and out of said housing, wherein said cylinder head includes a center bore;
   a piston, having an axis, said piston axially displaceably mounted within said housing;
   a seal arrangement, mounted in said center bore of said cylinder head around the periphery of said piston, wherein said seal arrangement prevents fluid from escaping said housing between said cylinder head and said piston; and
   means for rotating said seal arrangement about said axis of said piston.

6. A hydraulic cylinder according to claim 5, wherein said means for rotating said seal arrangement comprises:
   a second hydraulic cylinder, having a piston displaceably mounted in a housing, said second hydraulic cylinder being a double acting type cylinder;
   means for engaging said seal arrangement and said second hydraulic cylinder;
   wherein said engaging means engages said seal arrangement and said second hydraulic cylinder such that axial movement of said second hydraulic cylinder piston causes said seal arrangement to rotate about said hydraulic cylinder piston.

7. An elevator jack, comprising:
   a housing, having a cylinder head attached to one end of said housing, and a port through which fluid may pass into and out of said housing, wherein said cylinder head includes a center bore;
   a piston, having an axis, said piston axially displaceably mounted within said housing;
   a seal arrangement, mounted in said center bore of said cylinder head around the periphery of said piston, wherein said seal arrangement prevents fluid from escaping said housing between said cylinder head and said piston; and
   means for rotating said seal arrangement about said axis of said piston.

8. An elevator jack according to claim 7, wherein said means for rotating said seal arrangement comprises:
   a hydraulic cylinder, having a piston displaceably mounted in a housing, said hydraulic cylinder being a double acting type cylinder;

means for engaging said seal arrangement and said hydraulic cylinder;

wherein said engaging means engages said seal arrangement and said hydraulic cylinder such that axial movement of said hydraulic cylinder piston causes said seal arrangement to rotate about said elevator jack piston.

* * * * *